(12) United States Patent
Nguyen et al.

(10) Patent No.: US 11,965,997 B2
(45) Date of Patent: Apr. 23, 2024

(54) DETERMINING FAULT SURFACES FROM FAULT ATTRIBUTE VOLUMES

(71) Applicant: Landmark Graphics Corporation, Houston, TX (US)

(72) Inventors: Xuan Nam Nguyen, Katy, TX (US); Alejandro Jaramillo, Edinburgh (GB)

(73) Assignee: Landmark Graphics Corporation, Houston, TX (US)

( * ) Notice: Subject to any disclaimer, the term of this patent is extended or adjusted under 35 U.S.C. 154(b) by 336 days.

(21) Appl. No.: 17/505,033

(22) Filed: Oct. 19, 2021

(65) Prior Publication Data
US 2023/0117096 A1 Apr. 20, 2023

(51) Int. Cl.
*G01V 1/30* (2006.01)

(52) U.S. Cl.
CPC .............. *G01V 1/301* (2013.01); *G01V 1/306* (2013.01); *G01V 1/302* (2013.01); *G01V 2210/65* (2013.01)

(58) Field of Classification Search
USPC .......................................................... 702/14
See application file for complete search history.

(56) References Cited

U.S. PATENT DOCUMENTS

| | | | |
|---|---|---|---|
| 5,311,484 A * | 5/1994 | Anderson | G01V 9/005 367/47 |
| 6,018,498 A | 1/2000 | Neff et al. | |
| 7,069,149 B2 | 6/2006 | Goff et al. | |
| 9,618,639 B2 | 4/2017 | Witte et al. | |
| 2002/0013661 A1* | 1/2002 | Van Riel | G01V 1/306 702/2 |
| 2006/0122780 A1 | 6/2006 | Cohen et al. | |
| 2015/0234070 A1 | 8/2015 | Xu et al. | |
| 2018/0003841 A1* | 1/2018 | Souche | G01V 1/345 |
| 2021/0247535 A1* | 8/2021 | Fitz-Gerald | G01V 1/306 |

OTHER PUBLICATIONS

Emerson, "Automated Seismic Interpretation and Model Building Using all of the Seismic Data", available at https://www.pdgm.com/solutions/interpretation/seismic-interpretation/global-interpretation#, as early as May 27, 2021, 2 pages.

(Continued)

*Primary Examiner* — Paul D Lee
(74) *Attorney, Agent, or Firm* — Kilpatrick Townsend & Stockton LLP

(57) ABSTRACT

Hydrocarbon exploration and extraction can be facilitated by determining fault surfaces from fault attribute volumes. For example, a system described herein can receive a fault attribute volume for faults in a subterranean formation determined using seismic data. The fault attribute volume may include multiple traces with trace locations. The system can determine a set of fault samples for each trace location. Each fault sample can include fault attributes such as a depth value, an amplitude value, and a vertical thickness value. The system can determine additional fault attributes such as a dip value and an azimuth value for each fault sample of each trace location. The system can determine fault surfaces for the faults using the fault samples and fault attributes. The system can then output the fault surfaces for use in a hydrocarbon extraction operation.

20 Claims, 7 Drawing Sheets

(56) References Cited

OTHER PUBLICATIONS

Geoteric, "Adaptive Interpretation", available at https://www.geoteric.com/interpret,, as early as May 27, 2021, 13 pages.

Hale, "Fault Surfaces and Fault Throws from 3D Seismic Image", Center for Wave Phenomena, Colorado School of Mines, Golden CO,, 2012, pp. 205-220.

Maral et al., "Enhancing Fault Interpretation Efficiency and Accuracy with Deep Convolutional Neural Network and Elastic Cloud Compute", First EAGE Digitalization Conference and Exhibition, Nov. 30-Dec. 3, 2020, Vienna, Austria, Nov. 30, 2020, 5 pages.

Wu et al., "3D Seismic Image Processing for Interpretation of Faults, Unconformity and Horizons", Colorado School of Mines, Golden CO, 2015, 10 pages.

International Application, International Search Report and Written Opinion, PCT/US2021/055607, dated Jun. 28, 2022, 11 pages.

* cited by examiner

US 11,965,997 B2

DETERMINING FAULT SURFACES FROM FAULT ATTRIBUTE VOLUMES

TECHNICAL FIELD

The present disclosure relates generally to hydrocarbon exploration and, more particularly (although not necessarily exclusively), to determining fault surfaces from fault attribute volumes.

BACKGROUND

A hydrocarbon exploration operation can involve evaluating a subterranean formation for identifying hydrocarbon resources. The hydrocarbon exploration operation can include determining attributes of geological faults. The geological faults can indicate a nearby presence of hydrocarbon resources or material such as oil, gas, or other suitable hydrocarbon material. Machine learning models may be used to determine fault attributes from seismic data measuring the subterranean formation in hydrocarbon exploration operations. But the models may not allow resolution or a high level of accuracy to be retained with respect to the geological interpretation of fault planes that are necessary for the identification of hydrocarbon bearing formations, improving structural trapping definition, preventing drilling hazards, and achieving a better understanding of the structure of the subterranean formation.

DETAILED DESCRIPTION

Certain aspects and features of the present disclosure relate to determining fault surfaces in a subterranean formation using fault attribute volumes. Fault attribute volumes may be determined from seismic data measured in the subterranean formation. A fault attribute volume may include multiple traces. A set of fault intersection points, or "fault samples," for each trace can be determined. Each fault sample can include fault attributes such as an inline location, a crossline location, a depth value, an amplitude value of the fault attribute volume, and a vertical thickness value. A dip value and azimuth value can be determined at the location of each fault sample by applying a plane fit approximation to a group of nearby points from the neighbor traces. Fault surfaces may then be extracted by connecting nearby fault samples that exhibit correlated sets of fault attributes. The fault surfaces may be automatically integrated into a geological model of the subterranean formation.

The vertical thickness can be used to determine the local dip and azimuth of every fault sample by finding nearby points within a cube that is centered at the fault sample location. The width of the cube may be the number of traces at the current location, and the height of the cube may be the vertical thickness multiplied by a user inputted scale factor. A subset of nearby points that are trackable from the current fault sample are determined to exclude points belonging to a different fault plane to further improve the accuracy of the fault surface computation and subsequent dip and azimuth values. Excluding the points belonging to different faults can improve the accuracy of the fault surface computations, as it can be difficult to extract the positions and attributes of intersecting faults without using the vertical thickness. Additionally, azimuth values from [0°, 360°] may be determined to accurately differentiate nearby fault samples that have the same dip and strike value but opposite dipping orientation. In some examples, fault surfaces can be determined without the use of strike attributes or dip attributes.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
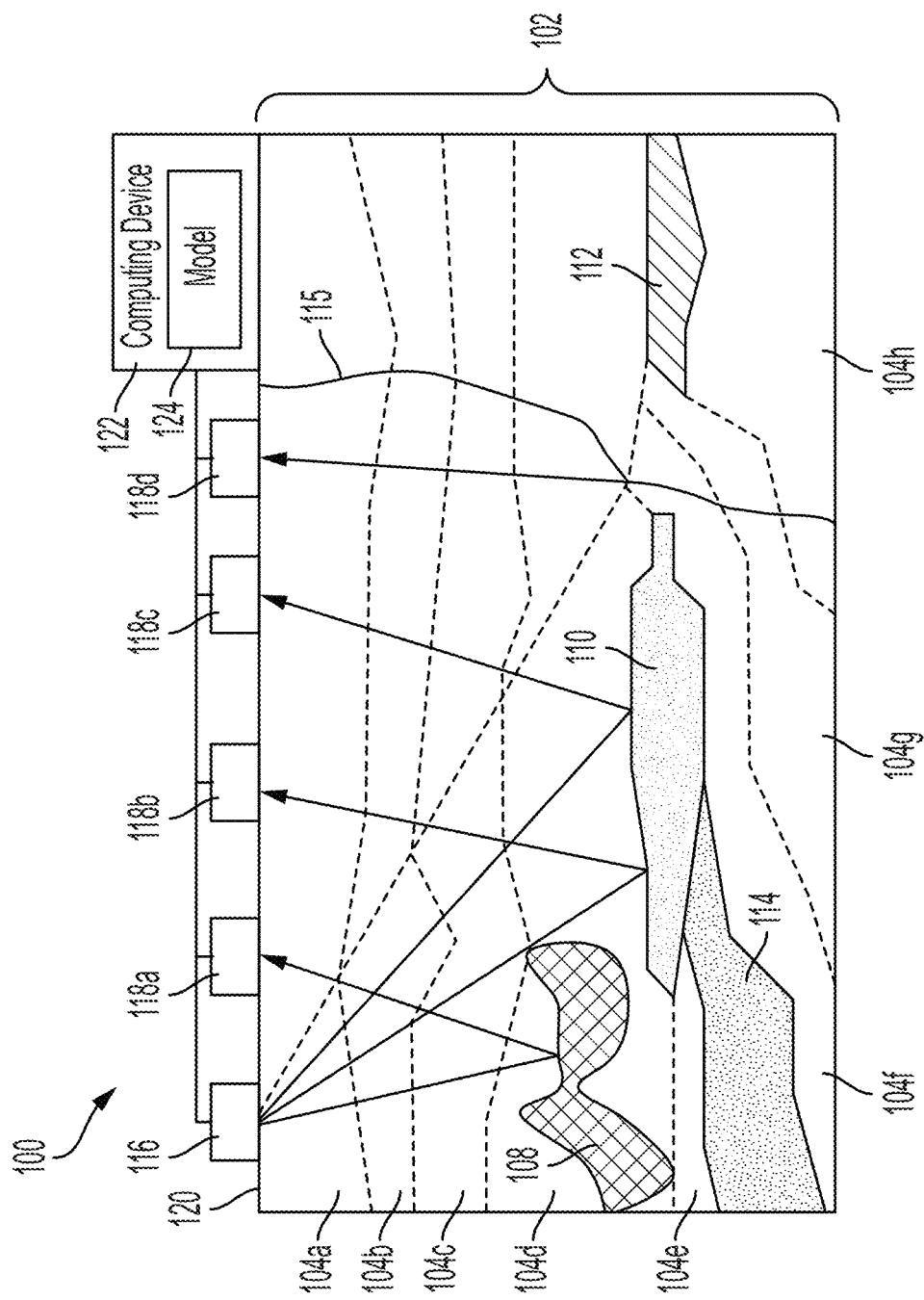
FIG. 1 is a cross-sectional view of system for determining fault surfaces using fault attribute volumes according to one example of the present disclosure.

FIG. 1 is a cross-sectional view of system 10 for determining fault surfaces using fault attribute volumes according to one example of the present disclosure. The system 100 includes a subterranean formation 102 formed from various earth strata 104a-h. The subterranean formation 102 includes various geological bodies, such as a salt body 108 that includes salt, an oil body 110 that includes oil, a gas body 112 that includes gas, and a water body 114 that includes water. In some examples, the subterranean formation 102 may include more, fewer, or other types of earth strata and geological bodies. Additionally, the subterranean formation 102 can include a geological fault 115 that can represent a discontinuity in the subterranean formation 102. In some examples, the geological fault 115 can represent a discontinuity with respect to the earth strata 104 and can separate two or more geological bodies. As illustrated, the subterranean formation 102 includes one geological fault 115, but the subterranean formation 102 can include other suitable amounts of geological faults.

At least one portion of the system 100 can be positioned at the surface 120 of the subterranean formation 102 for detecting geological bodies or otherwise characterizing geological faults in the subterranean formation 102. For example, the system 100 can include a signal source 116 and sensors 118a-d, which, for example, can be used to detect and receive seismic data about the subterranean formation 102. Examples of the signal source 116 can include a vibration unit, an explosive charge, or other suitable type of signal source 116, and examples of the sensors 118a-d can include geophones, hydrophones, or other suitable types of sensors 118. The signal source 116 can emit one or more waves into a target area of the subterranean formation 102. In the example shown in FIG. 1, the waves are represented by black arrows and the target area is the portion of the subterranean formation positioned below sensors 118a-d. The waves can reflect off the geological bodies, the geological fault 115, or other suitable components of the subterranean formation 102 and return to the sensors 118. The sensors 118 can detect the reflected waves and provide corresponding seismic data to a computing device 122, which may be included in the system 100.

As one particular example, the signal source 116 can include a vibration unit and the sensors 118 can include geophones. The vibration unit can emit vibrations that propagate through the target area of the subterranean formation 102, reflect off the geological bodies, the fault, or other suitable components, and return to the geophones. The geophones can receive the reflected vibrations and generate seismic data based on the reflected vibrations. The geophones can then transmit their respective seismic data to the computing device 122. The computing device 122 can include a trained machine learning model 124 that can receive seismic data as input and provide fault attribute volumes as an output. The computing device 122 may then determine fault surfaces using the fault attribute volumes.

While FIG. 1 depicts an exemplary system 100 that includes certain components (e.g., the signal source 116, sensors 118a-d, and computing device 122), other examples may include more, fewer, or different components. For instance, difference examples may involve the computing device 122 receiving seismic data from a remote computing device via a network, such as the Internet. The computing device 122 can receive the seismic data from the remote computing device additionally or alternatively to receiving seismic data from the sensors 118a-d. And, in some examples, the computing device 122 may be positioned offsite, rather than proximate to the target area of the subterranean formation 102.

Figure 2:
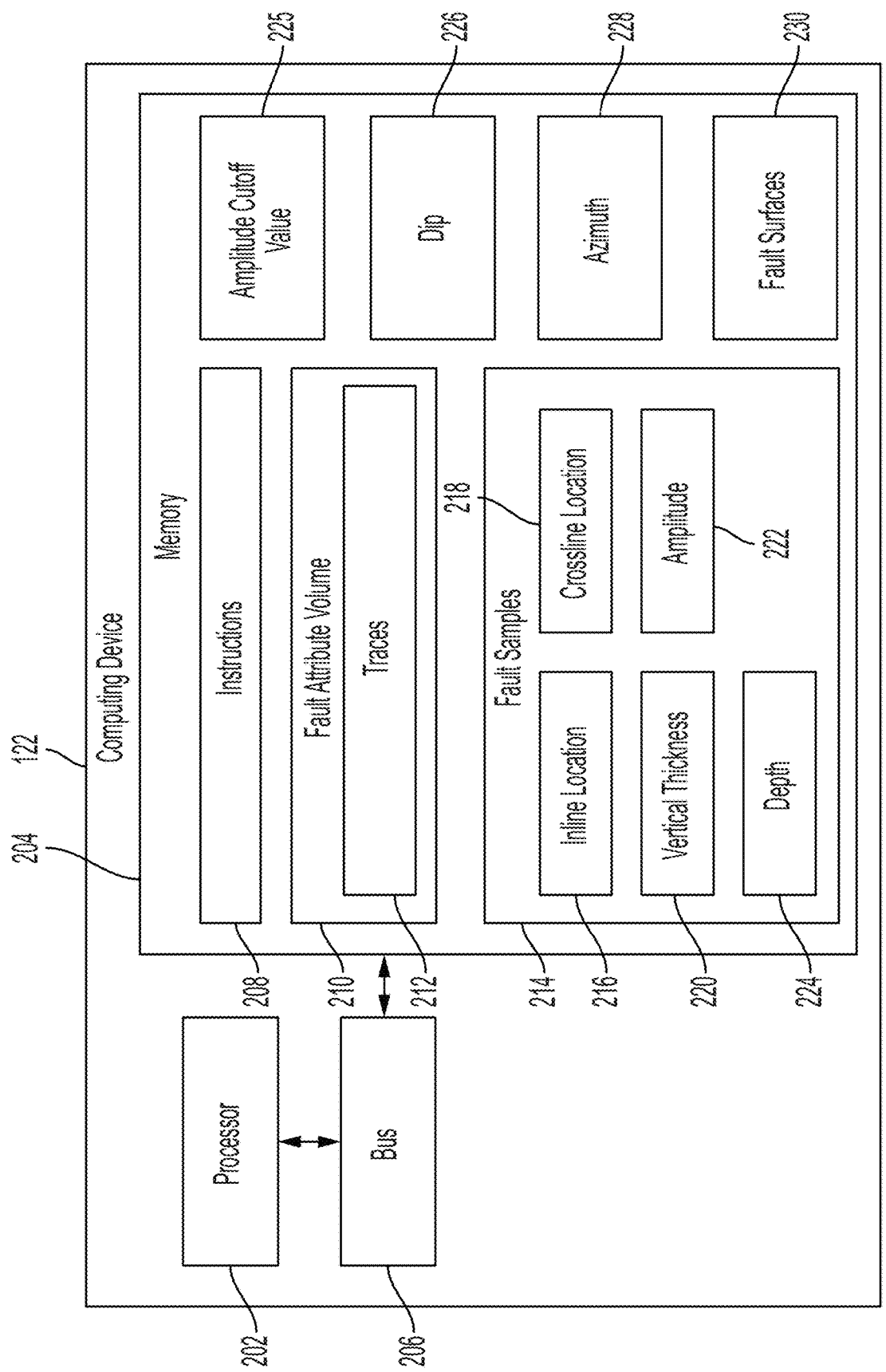
FIG. 2 is a block diagram of a computing device for determining fault surfaces using fault attribute volumes according to one example of the present disclosure.

FIG. 2 is a block diagram of a computing device 122 for determining fault surfaces 230 using fault attribute volumes 210 according to one example of the present disclosure. The components shown in FIG. 2, such as the processor 202, the memory 204, bus 206, and the like, may be integrated into a single structure such as within a single housing of the computing device 122. Alternatively, the components shown in FIG. 2 can be distributed from one another and in electrical communication with each other.

As shown, the computing device 122 includes a processor 202 communicatively coupled to a memory 204 by a bus 206. The processor 202 can include one processor or multiple processors. Non-limiting examples of the processor 202 include a Field-Programmable Gate Array (FPGA), an application-specific integrated circuit (ASIC), a microprocessor, or any combination of these. The processor 202 can execute instructions 208 stored in the memory 204 to perform operations. In some examples, the instructions 208 can include processor-specific instructions generated by a compiler or an interpreter from code written in any suitable computer-programming language, such as C, C++, C#, or Java.

The memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory 204 can include a non-transitory computer readable medium from which the processor 202 can read instructions 208. A non-transitory computer-readable medium can include electronic, optical, magnetic, or other storage devices capable of providing the processor 202 with the instructions 208 or other program code. Non-limiting examples of a non-transitory computer-readable medium include magnetic disk(s), memory chip(s), random-access memory (RAM), an ASIC, a configured processor, or any other medium from which a computer processor can read the instructions 208.

Additionally, the memory 204 can further include fault attribute volumes 210 determined from seismic data measured in a subterranean formation 102. A fault attribute volume 210 can include multiple traces 212. The processor 202 may determine fault samples 214 for each trace 212 in the fault attribute volume 210 based on fault attributes and a user-inputted amplitude cutoff value. Each fault sample 214 can include fault attributes such as an inline location 216, a crossline location 218, a vertical thickness value 220, an amplitude value 222, and a depth value 224. The processor 202 can determine a dip value 226 and an azimuth value 228 using the fault attributes. The processor 202 can then extract fault surfaces 230 using the fault attributes, dip value 226, and azimuth value 228 for each fault sample 214.

Figure 3:
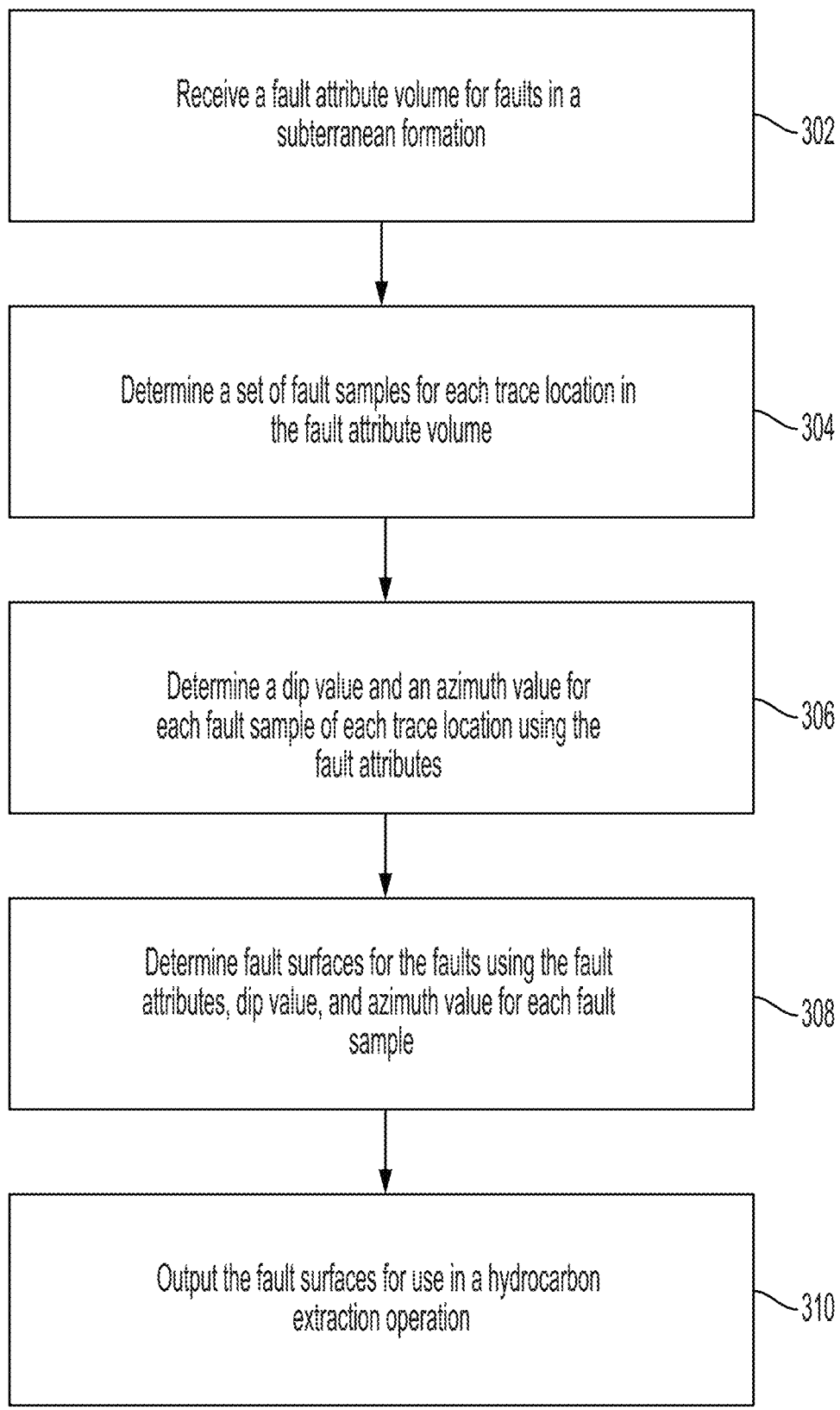
FIG. 3 is a flowchart of a process for determining fault surfaces using fault attribute volumes according to one example of the present disclosure.

In some examples, the computing device 122 can implement the process shown in FIG. 3 for effectuating some aspects of the present disclosure. Other examples can involve more operations, fewer operations, different operations, or a different order of the operations shown in FIG. 3. The operations of FIG. 3 are described below with reference to the components shown in FIG. 2.

FIG. 3 is a flowchart of a process for determining fault surfaces 230 using fault attribute volumes 210 according to one example of the present disclosure. At block 302, the processor 202 receives a fault attribute volume 210 for faults in a subterranean formation 102. The fault attribute volume 210 may be determined from seismic data measured in a subterranean formation 102, as described above for FIG. 2. The fault attribute volume 210 is depicted in FIG. 4.

Figure 4:
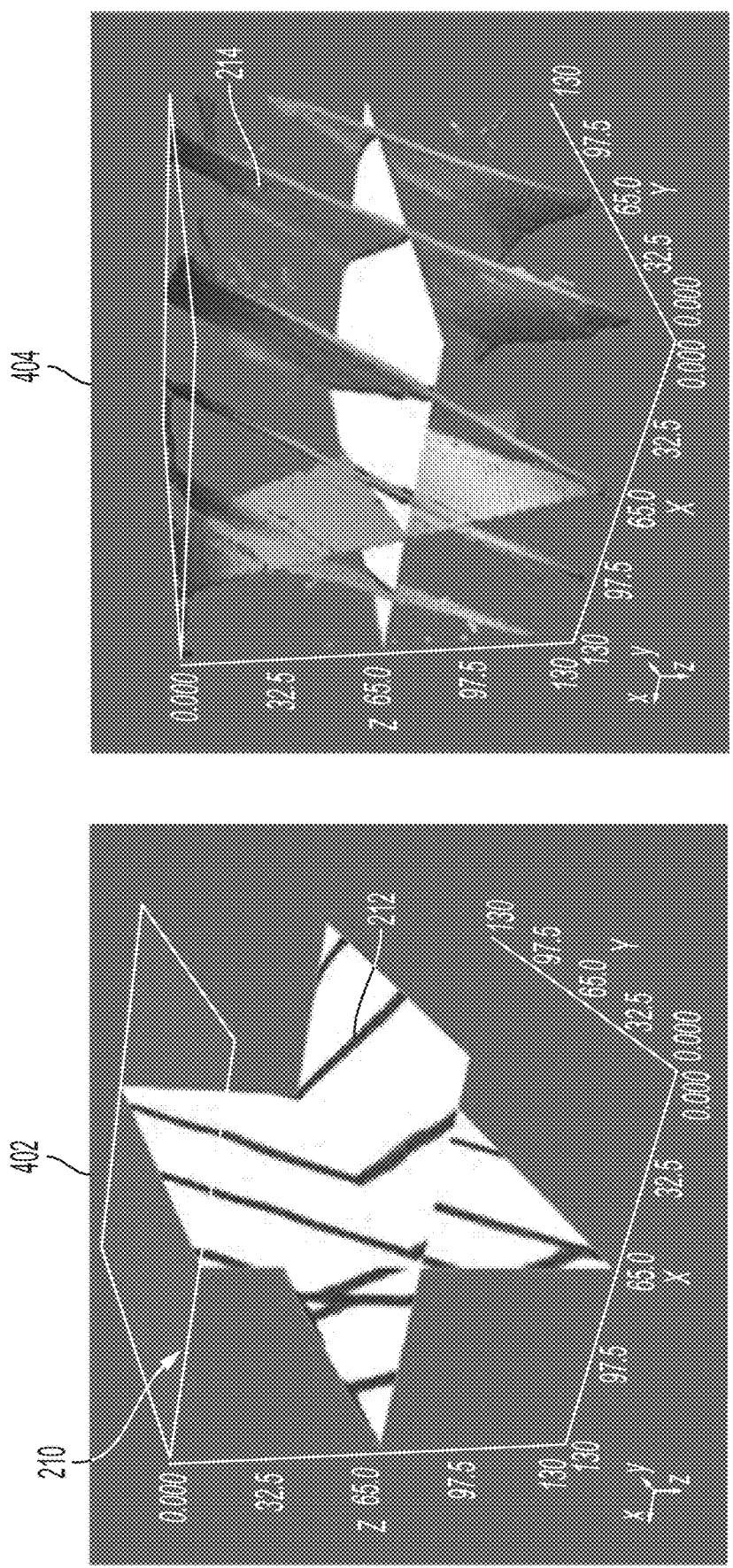
FIG. 4 is a series of graphs for determining fault surfaces using fault attribute volumes according to one example of the present disclosure.
Figure 4:
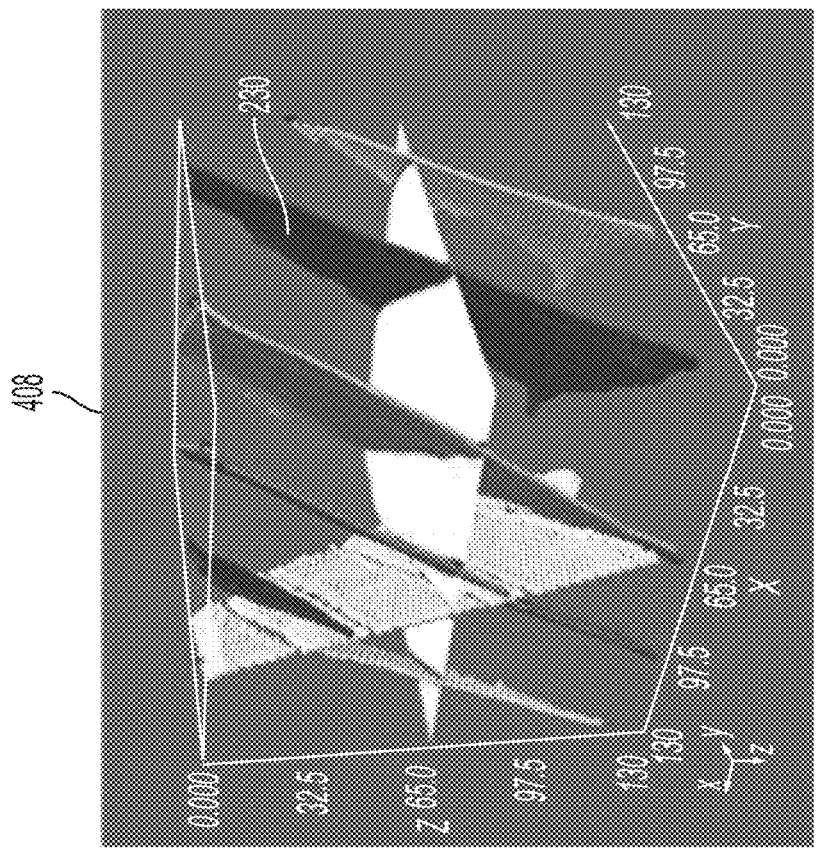
Figure 4:
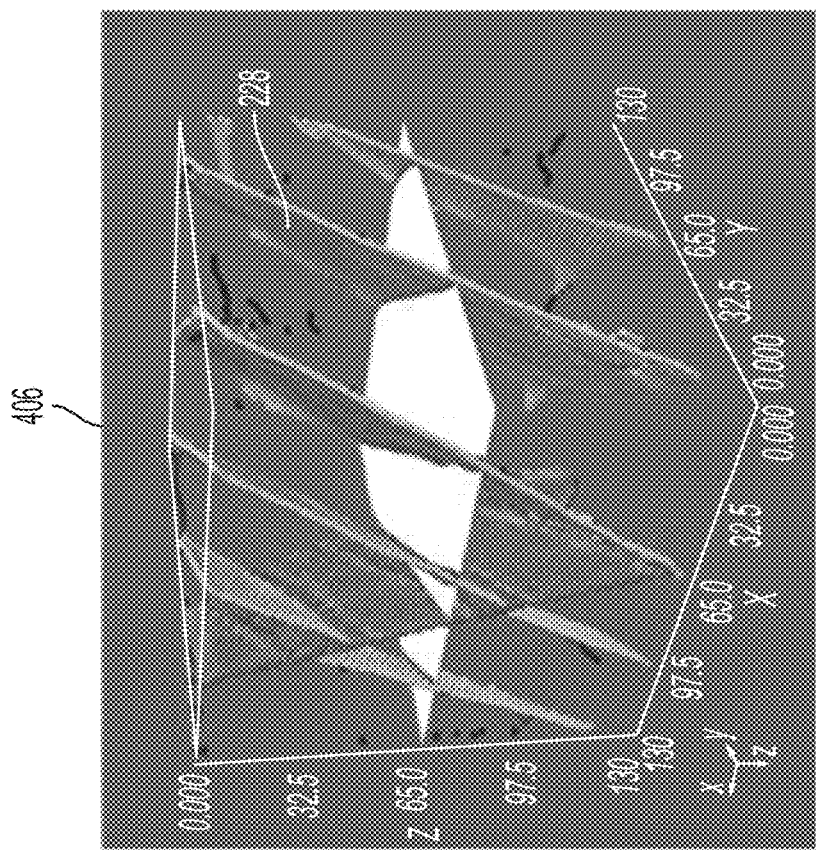

FIG. 4 is a series of graphs for determining fault surfaces 230 using fault attribute volumes 210 according to one example of the present disclosure. Graph 402 depicts a fault attribute volume 210 including multiple traces 212. The fault attribute volume 210 may include multiple traces 212, some of which may intersect.

Referring back to FIG. 3, at block 304, the processor 202 determines a set of fault samples 214 for each trace 212 in the fault attribute volume 210. The fault samples 214 on each trace 212 are depicted in graph 404 of FIG. 4. Each fault sample 214 can have fault attributes. The fault attributes can include an inline location 216 and a crossline location 218 (e.g., the trace location). The fault attributes can further include a vertical thickness value 220, an amplitude value 222, and a depth value 224. In some examples, the depth value 224 may be a time value.

Figure 5:
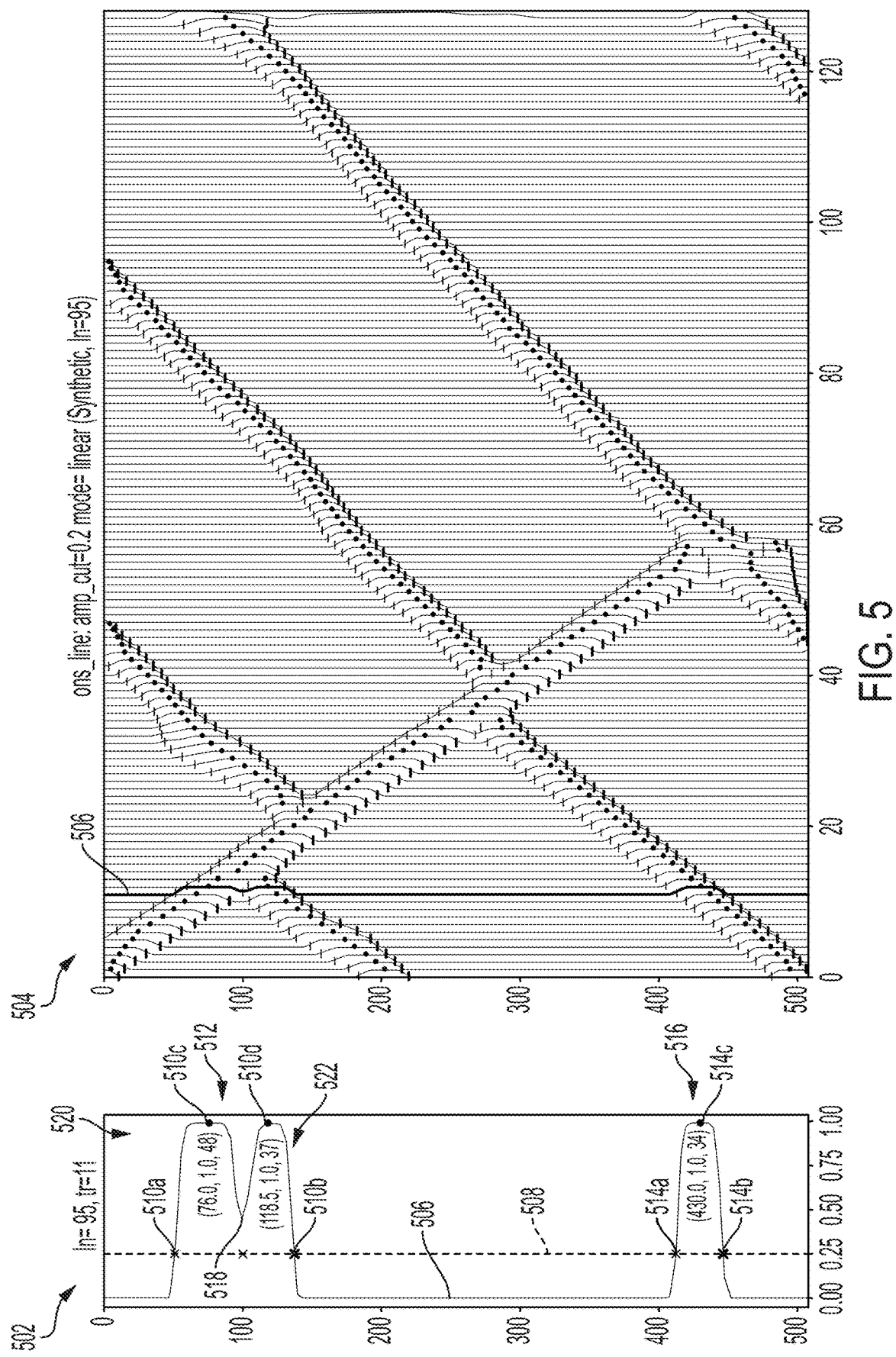
FIG. 5 is a pair of graphs for determining fault attributes according to one example of the present disclosure.

At each trace location, the processor 202 can determine the fault attributes. The processor 202 can identify a part of start depth and end depth positions along the vertical depth axis where amplitude values 222 of the trace 212 are greater than a user-inputted amplitude cutoff value 225. FIG. 5 is a pair of graphs 502 and 504 for determining fault attributes, according to one example of the present disclosure. Graph 504 depicts intersecting fault lines, with each vertical line depicting a single trace such as trace 506. Graph 502 depicts amplitudes for trace 506. The amplitude cutoff value 225 is depicted as line 508 on graph 502. Amplitudes for the trace 506 that are greater than the line 508 and appear as a trough may indicate the presence of an individual fault. For each trough, the processor 202 may identify pairs of start depth and end depth positions such as start depth 510a and end depth 510b for a first trough 512 and start depth 514a and end depth 514b for a second trough 516. The processor 202 may determine that trough 512 includes an amplitude 518 between the start depth 510a and the end depth 510b that is lower than the peak amplitudes for trough 512. This lower amplitude 518 may indicate the presence of two intersecting faults. Therefore, the processor 202 may extract two troughs from trough 512. New trough 520 may have a start depth 510*a* and an end depth at amplitude 518, and new trough 522 may have a start depth at amplitude 518 and an end depth 510*b*. Extracting intersecting faults in this manner may overcome the limited vertical resolution of fault attribute volumes.

The processor may then determine a depth value 224 that is a center value between the pairs of start depth and end depth positions. For example, graph 502 depicts depth value 510*c* for trough 520, depth value 510*d* for trough 522, and depth value 514*c* for trough 516. The depth value 224 may represent a most-likely depth position of a fault at the trace location. The processor 202 can determine the amplitude value 222 to be the maximum amplitude value of the fault attribute volume 210 between the start depth and end depth positions. In some examples, the amplitude value 222 may be a binary value of 0 or 1. The processor 202 can determine the vertical thickness value 220 to be the difference between the start depth and end depth positions. A small vertical thickness value 220 may indicate a fault with a low dip angle, and a large vertical thickness value 220 may indicate a fault with a high dip angle.

Figure 6:
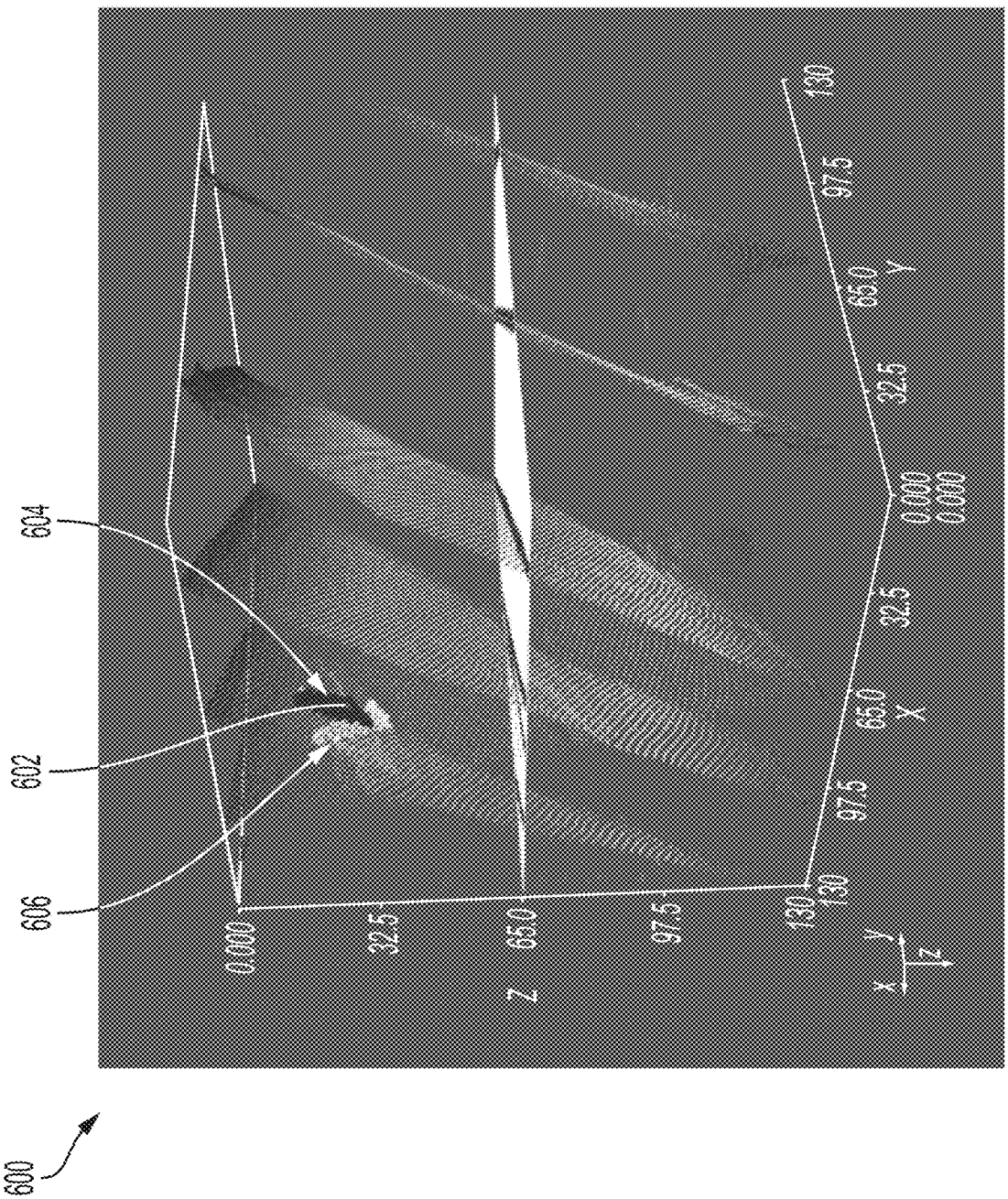
FIG. 6 is a graph depicting fault samples according to one example of the present disclosure.

At block 306, the processor 202 determines a dip value 226 and an azimuth value 228 of each fault sample 214 by using the fault attributes. For example, the processor 202 can determine a cube centered at the trace location. The width of the cube may be the number of offset traces at the trace location. The height of the cube may be the vertical thickness value 220 multiplied by a scale factor. The scale factor may be inputted by a user. The processor 202 may determine a sub-set of points in the cube tracked from the current fault sample 214 that excludes points that may belong to different faults. FIG. 6 is a graph 602 depicting fault samples 214, according to one example of the present disclosure. Fault sample 602 may be the point at which the cube is centered. The darker fault samples 604 may be points within the cube that are determined to belong to the current fault. The lighter fault samples 606 may be points within the cube that are determined to belong to different faults. The lighter fault samples 606 may be excluded from the cube.

The points that are not excluded from the cube may be used to determine the dip value 226 and azimuth value 228. The azimuth value 228 may range from [0°, 360°] unlike strike values, which may range from [−90°, 90°] or [0°, 180°]. In some examples, applying dip values 226 and azimuth values 228 to the current fault samples 214 may enable distinctions between nearby fault samples 214 that have the same dip values 226 and azimuth values 228, but with opposite dip orientation. When the azimuth value 228 is zero, it may be equivalent to the inline direction. The dip value 226 may range from [0°, 90°] and may be referenced to the Z plane (e.g., depth). Graph 406 of FIG. 4 depicts the calculated azimuth values 228 for the set of fault samples 214.

At block 308, the processor 202 determines fault surfaces 230 for the faults using the set of fault samples 214 and the dip values 226 and azimuth values 228 for each fault sample 214. For each trace location, the processor 202 can determine if the fault sample 214 can be connected to nearby fault samples 214 from the adjacent traces 212. Two fault samples 214 can be linked if they have a similar set of fault attributes (e.g., their vertical thickness value 220, amplitude value 222, depth value 224, dip value 226, and azimuth value 228). The processor 202 can extract fault surfaces 230 as the connected components of a network in which the nodes of the network are the fault samples 214, and the edges of the network are connected pairs of fault samples 214. The fault surfaces 230 are depicted in Graph 408 of FIG. 4.

At block 310, the processor 202 outputs the fault surfaces 230 for use in a hydrocarbon extraction operation. For example, the fault surfaces 230 may be inserted into a geological model of the subterranean formation 102. In some examples, the processor 202 may automatically integrate the fault surfaces 230 into a geological model.

In some aspects, systems, methods, and computer-readable mediums for determining fault structures from fault attributes are provided according to one or more of the following examples:

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a processor; and
   a memory that includes instructions executable by the processor for causing the processor to:
   receive a fault attribute volume for faults in a subterranean formation, the fault attribute volume comprising a plurality of traces having a plurality of trace locations;
   determine a set of fault samples for each trace location of the plurality of trace locations, each fault sample of the set of fault samples comprising a plurality of fault attributes including a vertical thickness value, wherein the vertical thickness value comprises a difference between a start depth and an end depth for the fault sample at the trace location;
   determine a dip value and an azimuth value for each fault sample of each trace location of the plurality of trace locations using the plurality of fault attributes;
   determine fault surfaces for the faults using the plurality of fault attributes, dip value, and azimuth value for each fault sample of the set of fault samples; and
   output the fault surfaces for use in a hydrocarbon extraction operation.

2. The system of claim 1, wherein the memory further comprises instructions executable by the processor for causing the processor to automatically integrate the fault surfaces into a geological model of the subterranean formation.

3. The system of claim 1, wherein the memory further comprises instructions executable by the processor for causing the processor to determine the set of fault samples by:
   for each trace location of the plurality of trace locations:
   determining a plurality of amplitudes for the trace location that exceed a user-inputted amplitude cutoff value;
   determining individual faults for the trace location using the plurality of amplitudes; and
   determining the set of fault samples using the individual faults.

4. The system of claim 1, wherein the plurality of fault attributes comprises a depth value and an amplitude value.

5. The system of claim 4, wherein the memory further comprises instructions executable by the processor for causing the processor to determine the dip value and the azimuth value for each fault sample of each trace location of the plurality of trace locations by determining points within a cube centered at the trace location, wherein a width of the cube is a number of traces at the trace location and a height of the cube is a scale factor multiplied by the vertical thickness value.

6. The system of claim 5, wherein the memory further comprises instructions executable by the processor for causing the processor to determine the dip value and the azimuth value for each fault sample of each trace location of the plurality of trace locations by:
excluding fault samples within the cube that are not associated with a current fault sample; and
determining the dip value and the azimuth value from remaining fault samples in the cube.

7. The system of claim 1, wherein the fault attribute volume is determined from seismic data measured in the subterranean formation.

8. A method comprising:
receiving a fault attribute volume for faults in a subterranean formation, the fault attribute volume comprising a plurality of traces having a plurality of trace locations;
determining a set of fault samples for each trace location of the plurality of trace locations, each fault sample of the set of fault samples comprising a plurality of fault attributes including a vertical thickness value, wherein the vertical thickness value comprises a difference between a start depth and an end depth for the fault sample at the trace location;
determining a dip value and an azimuth value for each fault sample of each trace location of the plurality of trace locations using the plurality of fault attributes;
determining fault surfaces for the faults using the plurality of fault attributes, dip value, and azimuth value for each fault sample of the set of fault samples; and
outputting the fault surfaces for use in a hydrocarbon extraction operation.

9. The method of claim 8, further comprising automatically integrating the fault surfaces into a geological model of the subterranean formation.

10. The method of claim 8, further comprising determining the set of fault samples by:
for each trace location of the plurality of trace locations:
determining a plurality of amplitudes for the trace location that exceed a user-inputted amplitude cutoff value;
determining individual faults for the trace location using the plurality of amplitudes; and
determining the set of fault samples using the individual faults.

11. The method of claim 8, wherein the plurality of fault attributes comprises a depth value and an amplitude value.

12. The method of claim 11, wherein determining the dip value and the azimuth value for each trace location of the plurality of trace locations further comprises determining points within a cube centered at the trace location, wherein a width of the cube is a number of traces at the trace location and a height of the cube is a scale factor multiplied by the vertical thickness value.

13. The method of claim 12, wherein determining the dip value and the azimuth value for each trace location of the plurality of trace locations further comprises:
excluding fault samples within the cube that are not associated with a current trace; and
determining the dip value and the azimuth value from remaining fault samples in the cube.

14. The method of claim 8, wherein the fault attribute volume is determined from seismic data measured in the subterranean formation.

15. A non-transitory computer-readable medium comprising instructions that are executable by a processor for causing the processor to perform operations comprising:
receiving a fault attribute volume for faults in a subterranean formation, the fault attribute volume comprising a plurality of traces having a plurality of trace locations;
determining a set of fault samples for each trace location of the plurality of trace locations, each fault sample of the set of fault samples comprising a plurality of fault attributes including a vertical thickness value, wherein the vertical thickness value comprises a difference between a start depth and an end depth for the fault sample at the trace location;
determining a dip value and an azimuth value for each trace location of the plurality of trace locations using the plurality of fault attributes;
determining fault surfaces for the faults using the plurality of fault attributes, dip value, and azimuth value for each fault sample of the set of fault samples; and
outputting the fault surfaces for use in a hydrocarbon extraction operation.

16. The non-transitory computer-readable medium of claim 15, further comprising instructions that are executable by the processor for causing the processor to automatically integrate the fault surfaces into a geological model of the subterranean formation.

17. The non-transitory computer-readable medium of claim 15, further comprising instructions that are executable by the processor for causing the processor to determine the set of fault samples by:
for each trace location of the plurality of trace locations:
determining a plurality of amplitudes for the trace location that exceed a user-inputted amplitude cutoff value;
determining individual faults for the trace location using the plurality of amplitudes; and
determining the set of fault samples using the individual faults.

18. The non-transitory computer-readable medium of claim 15, wherein the plurality of fault attributes comprises a depth value and an amplitude value.

19. The non-transitory computer-readable medium of claim 18, further comprising instructions executable by the processor for causing the processor to determine the dip value and the azimuth value for each trace location of the plurality of trace locations by determining points within a cube centered at the trace location, wherein a width of the cube is a number of traces at the trace location and a height of the cube is a scale factor multiplied by the vertical thickness value.

20. The non-transitory computer-readable medium of claim 19, further comprising instructions executable by the processor for causing the processor to determine the dip value and the azimuth value for each trace location of the plurality of trace locations by:
excluding fault samples within the cube that are not associated with a current trace; and
determining the dip value and the azimuth value from remaining fault samples in the cube.

* * * * *